US008284205B2

(12) United States Patent
Miller et al.

(10) Patent No.: US 8,284,205 B2
(45) Date of Patent: Oct. 9, 2012

(54) METHODS AND APPARATUSES FOR LOAD BALANCING BETWEEN MULTIPLE PROCESSING UNITS

(75) Inventors: Howard Miller, Saratoga, CA (US); Ralph Brunner, Cupertino, CA (US)

(73) Assignee: Apple Inc., Cupertino, CA (US)

(*) Notice: Subject to any disclaimer, the term of this patent is extended or adjusted under 35 U.S.C. 154(b) by 812 days.

(21) Appl. No.: 11/923,463

(22) Filed: Oct. 24, 2007

(65) Prior Publication Data

US 2009/0109230 A1 Apr. 30, 2009

(51) Int. Cl.
*G06F 15/16* (2006.01)
*G06F 15/00* (2006.01)
*G06T 1/00* (2006.01)

(52) U.S. Cl. ..................... 345/502; 345/501

(58) Field of Classification Search ............. 345/501, 345/502, 503, 504, 505
See application file for complete search history.

(56) References Cited

U.S. PATENT DOCUMENTS

| | | | |
|---|---|---|---|
| 7,663,633 B1* | 2/2010 | Diamond et al. | 345/503 |
| 7,730,335 B2* | 6/2010 | Sutardja et al. | 713/320 |
| 7,788,516 B2 | 8/2010 | Conroy | |
| 7,802,120 B2 | 9/2010 | Conroy | |
| 2003/0009748 A1* | 1/2003 | Glanville et al. | 717/140 |
| 2005/0049729 A1* | 3/2005 | Culbert et al. | 700/50 |
| 2006/0059494 A1* | 3/2006 | Wexler et al. | 718/105 |
| 2007/0049134 A1 | 3/2007 | Conroy | |
| 2007/0050650 A1* | 3/2007 | Conroy et al. | 713/300 |
| 2007/0067136 A1 | 3/2007 | Conroy | |
| 2007/0074011 A1* | 3/2007 | Borkar et al. | 712/227 |
| 2007/0220291 A1* | 9/2007 | Stufflebeam | 713/320 |
| 2007/0283175 A1* | 12/2007 | Marinkovic et al. | 713/320 |
| 2008/0055322 A1* | 3/2008 | Ryan et al. | 345/506 |
| 2008/0204460 A1* | 8/2008 | Marinkovic et al. | 345/502 |

* cited by examiner

*Primary Examiner* — Jacinta M Crawford
(74) *Attorney, Agent, or Firm* — Blakely, Sokoloff, Taylor & Zafman LLP

(57) ABSTRACT

Exemplary embodiments of methods and apparatuses to dynamically redistribute computational processes in a system that includes a plurality of processing units are described. The power consumption, the performance, and the power/performance value are determined for various computational processes between a plurality of subsystems where each of the subsystems is capable of performing the computational processes. The computational processes are exemplarily graphics rendering process, image processing process, signal processing process, Bayer decoding process, or video decoding process, which can be performed by a central processing unit, a graphics processing units or a digital signal processing unit. In one embodiment, the distribution of computational processes between capable subsystems is based on a power setting, a performance setting, a dynamic setting or a value setting.

21 Claims, 15 Drawing Sheets

| | CPU | | | GPU | | | DSP | | |
|---|---|---|---|---|---|---|---|---|---|
| | Power | Performance | Value | Power | Performance | Value | Power | Performance | Value |
| Task 1 | 5 | 7 | 5 | 6 | 8 | 5 | 3 | 4 | 5 |
| Task 2 | 6 | 3 | 1 | 5 | 0.1 | 2 | 8 | 8 | 4 |
| Task 3 | 4 | 6 | 5 | 3 | 6 | 8 | 2 | 3 | 4 |
| Task 4 | 3 | 6 | 8 | 9 | 7 | 2 | 80 | 8 | 0 |

|     | CPU specific | GPU specific | DSP specific | Common processes ||||
| --- | --- | --- | --- | --- | --- | --- | --- |
| CPU | X |   |   | X |   | X | X |
| GPU |   | X |   | X | X |   | X |
| DSP |   |   | X |   | X | X | X |

Fig. 2

|  | CPU | | | GPU | | | DSP | | |
|---|---|---|---|---|---|---|---|---|---|
|  | Power | Performance | Value | Power | Performance | Value | Power | Performance | Value |
| Task 1 | 5 | 7 | 5 | 6 | 8 | 5 | 3 | 4 | 5 |
| Task 2 | 6 | 3 | 1 | 5 | 0.1 | 2 | 8 | 8 | 4 |
| Task 3 | 4 | 6 | 5 | 3 | 6 | 8 | 2 | 3 | 4 |
| Task 4 | 3 | 6 | 8 | 9 | 7 | 2 | 80 | 8 | 0 |

Fig. 4

| Low power: Lowest power consumption |
|---|
| High performance: Fastest performance |
| Value: Most cost effective |
| Dynamic: Automatically switch tasks |

Fig. 5

| Task 1 | CPU | | | GPU | | | DSP | | |
|---|---|---|---|---|---|---|---|---|---|
| | Power | Performance | Value | Power | Performance | Value | Power | Performance | Value |
| Idle | 5 | 7 | 5 | 6 | 8 | 5 | 3 | 4 | 5 |
| 30% | 6 | 7 | 4 | 6 | 8 | 5 | 3 | 4 | 5 |
| 60% | 7 | 6 | 3 | 6 | 8 | 5 | 5 | 3 | 2 |
| 90% | 8 | 4 | 2 | 8 | 7 | 3 | 7 | 3 | 1 |

Fig. 6

METHODS AND APPARATUSES FOR LOAD BALANCING BETWEEN MULTIPLE PROCESSING UNITS

TECHNOLOGY FIELD

At least some embodiments of the present invention relate generally to data processing systems, and more particularly but not exclusively to the management of power usage in data processing systems.

BACKGROUND

Traditionally, computer systems are designed to customarily and separately handle different processing tasks. For example, central processing units (CPU) are designed to handle general purpose processes, graphics processing units (GPU) are designed to handle graphics-related processes, and digital signal processing units (DSP) are designed to handle digital signal computational processes.

Further, as the operating power consumption of individual components of a typical computer system creep upwards, the power budget of such a system has become tighter. It is now becoming a challenge to design a computer system to simultaneously achieve various high performance goals, such as high computing power, compactness, quietness, better battery performance, etc. For example, portable computer systems, such as laptop computers, have a limited battery output capability; and thus a given battery output capability may limit a system from performing at a continuous high performance capability with dedicated processing units for certain computational processes.

Traditional power management systems rely heavily on throttling to manage power consumption. Virtually all power management systems employ reduction of process performance, in one form or another, in order to reduce power consumption. The reduction in power consumption is achieved by selecting different states of operation (e.g. frequency and operating voltage of main processor) depending upon the desired state of the system; for example, if reduced power consumption is desired, the main processor is operated at a reduced frequency and is supplied a reduced operating voltage. These states of different frequencies and voltages are preselected when a system is designed; in other words, a designer of a system selects hardware components and designs software to provide these different states when a system is built with these components and software. When such a system is operating, the system changes state based upon a user setting (e.g. the user has selected battery operation).

SUMMARY OF THE DESCRIPTION

Exemplary embodiments of methods and apparatuses to dynamically optimize power and performance in a data processing system are described, and these embodiments employ a redistribution of computational processes among a plurality of subsystems wherein each of the subsystems may be capable of performing the same computational process. The redistribution of computational processes can be done dynamically while the system is running without requiring a rebooting of the system. The subsystems may be, for example, a central processing unit ("CPU"), a graphics processor ("GPU"), and a digital signal processing ("DSP") of a computer system or other type of data processing system. The system that includes the plurality of the subsystems may be a portable device, such as a laptop computer or a cellular telephone or an embedded system or a consumer electronic device.

In one embodiment, power consumption, performance, and cost effectiveness for each subsystem and for each computational process are determined and saved in a data structure (e.g. a table). Determining this information can comprise producing matrices of power consumption, performance, and cost effectiveness for each of the subsystems and the computational processes which may be different types of computational processes. This information can then be used in dynamically redistributing the computation processes among the subsystems; for example, the redistributing can be done according to a predetermined setting (such as a reduced power consumption state or a value performance state). For example, the computational processes can be redistributed to reduce the power consumption of the system, to achieve a high performance but with higher power consumption, or to achieve a cost effective, or value performance setting. Examples of cost effective or value performance settings include a performance/power ratio. A measure of value is normally inversely proportional to power consumed for a processing task and is normally inversely proportional to the amount of time consumed to perform a processing task. The computational processes can also be redistributed dynamically while the system is running to avoid undesirable situations such as a process/subsystem combination with abnormally high power consumption or exceeding the overall system power limit or exceeding thermal limits (e.g. a limit related to an operating temperature of a system).

In one embodiment, the information, which may be saved, of power consumption, performance, cost effective is determined as a function of the loading of the subsystems. For example, the performance of a CPU could be different when the CPU is idled as compared to when the CPU is busy at 90% capacity. Thus the percent capacity or the degree of usage of the subsystems can be used as an input to the redistribution process.

In one embodiment, the information of power consumption, performance, cost effectiveness is determined for processor-specific compiled codes of the computational processes. Further, a plurality of executable codes are compiled for a plurality of subsystems for each computational process to provide an effective redistribution of computational processes among the plurality of subsystems. For example, a graphics rendering process, though normally compiled to run on a GPU, is also compiled to run on CPU and on DSP to allow dynamic redistribution of such graphic rendering process to one or both of a CPU and a DSP. Re-distribution of this graphics rendering process to a CPU or DSP can include the porting of GPU-specific compiled codes to the CPU or DSP or alternatively may include emulating, on function call by function call basis, the GPU so that the software written for the GPU can run, through emulation, on the CPU or other processor.

In one embodiment, a software component, such as a software driver, for a subsystem is provided, which contains the information of power consumption, performance, cost effectiveness for the computational processes that the subsystem is capable of executing. The software driver or other software component allows the adding, upgrading or exchanging subsystems within a data processing system and still effectively provides the capacity for a redistribution of computational processes among the existing subsystems.

One exemplary embodiment may perform a method as follows. A setting, or other information, of a data processing system is selected or determined. The setting can be a power setting to achieve low power consumption, a performance setting to achieve high performance, a value setting to achieve a cost effective operation or value performance, or a dynamic setting to prevent abnormally poor performance, abnormally high power consumption, or exceeding power or thermal limits. The setting or other information used in determining how to redistribute processes may include load balancing criterion, which can directly or indirectly affect the power or performance. Then the computational processes of the data processing system are redistributed between the subsystems, e.g. processing units, of the data processing system based on the setting or other information used in determining how to redistribute processes. In one embodiment the computational processes are dynamically redistributed while the system is running and without requiring a rebooting of the system. In certain embodiments, the setting or other information used in determining how to redistribute computational processes may include information specifying or relating to a power source or sources (e.g. AC and/or battery power) available for use, a heat or thermal information (e.g. ambient temperature or temperature of a component of the system) or information indicating prior usage or performance characteristics (e.g., prior processor load or capacity usage levels, etc.).

In one embodiment, the power consumption, the performance or the cost effectiveness of the computational processes are determined for each of the subsystems. This information can be provided through pre-determined matrices, providing the evaluation of the specific computational process to be run in various subsystems. Preferably, the evaluation also considers the loading factor, e.g. how busy the subsystems currently are or the current remaining capacity of the subsystems. The redistributing of computational processes can reduce power consumption without affecting system performance level.

DESCRIPTION OF THE DRAWINGS

The present invention is illustrated by way of example and not limitation in the figures of the accompanying drawings in which like references indicate similar elements.

FIG. 2 illustrates that various processes can be run only in one processor, or can be run in multiple processors.

FIG. 4 illustrates an exemplary processor profile matrix comprising information for various processing tasks performed on different processors.

FIG. 5 illustrates various exemplary settings for controlling redistribution of processing tasks between processors according to one embodiment of the present invention.

FIG. 6 illustrates an exemplary processor profile matrix comprising information for a processing task performed on different processors with different loadings.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

Low power consumption is often a desirable goal for current computer systems, especially for portable computer systems, such as laptop computers, which have a limited battery output capability. Other types of data processing systems, such as special purpose computers, cellular telephones, personal digital assistants (PDAs), entertainment systems, media players, embedded systems, and consumer electronic devices, also often require low power consumption, particularly if they are battery powered. Such data processing systems are also often expected to provide high performance (e.g. process a sufficient quantity of data within a given period of time). At least certain embodiments of the present invention can help to achieve lower power consumption or higher performance or, in some cases both lower power consumption and high performance, for all of these data processing systems.

Exemplary embodiments of the present invention disclose a system optimization by redistributing processing tasks between sharable processing units in a data processing system. The optimization can include one of power consumption optimization, performance optimization, and cost-effectiveness or value optimization. In the best case scenarios, the redistribution process can result in power savings without any degradation, and sometimes even with improvement, in system performance.

Figure 1:
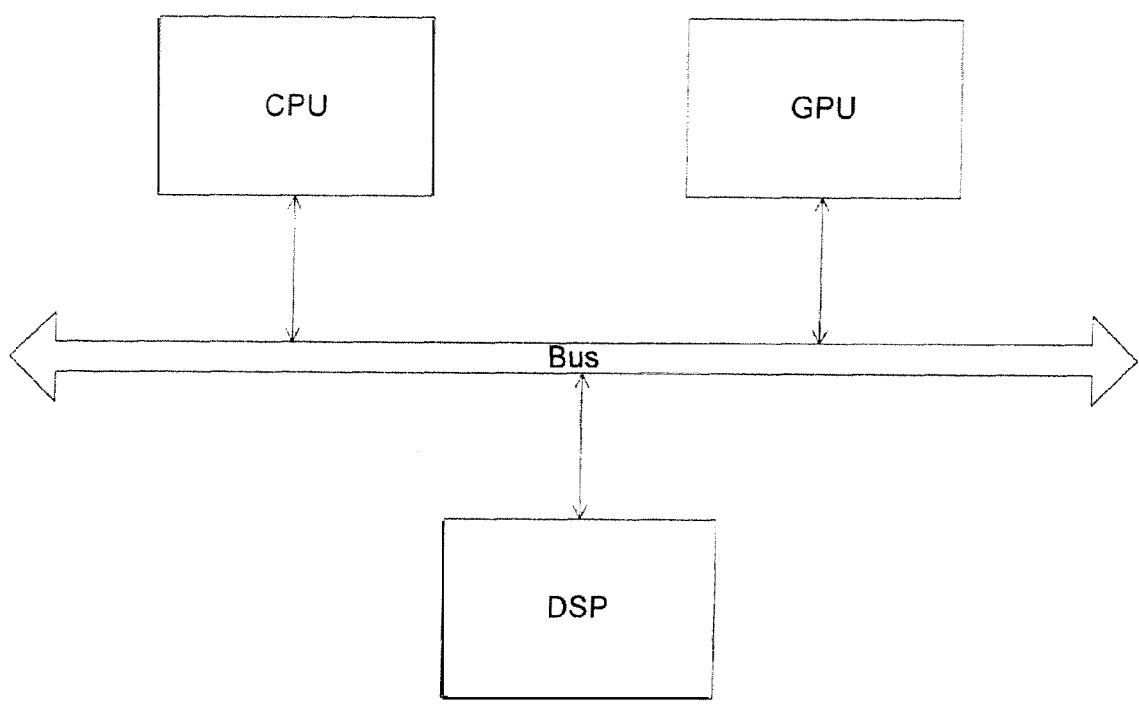
FIG. 1 illustrates an exemplary system according to the present invention comprising multiple processing units.

The advancements of microelectronics have provided various special purpose processing units and secondary general purpose processing units within the same data processing system, in addition to the main CPU. For example, secondary CPU or external GPU can be installed to off-load tasks from internal processors. Digital signal processing operations such as compression, error checking and error detection are specially designed to run on DSPs (digital signal processors). Also, the advancement of GPUs in the last decade have enabled a significant number of rendering, compositing and displaying tasks to migrate from the CPU (central processing unit) to the GPU. The current technology enables imaging operations or other more general parallel operations to be completed in less time on a special purpose GPU than on the general purpose CPU. FIG. 1 illustrates an exemplary data processing system, shown in block form, comprising various processing units such as a CPU block which may include multiple cores; a GPU block which may be an internal, on-board, system or external GPU; and a DSP block, internal or external, all communicating through a communication bus (which may in fact be a set of buses with bus bridges as is known in the art).

Further advancements have currently provided greater flexibility to special purpose processing units. For example, GPUs have incorporated programmable shaders, and have been exposed to the system and application developers to make this subsystem appear to be more like a general processing unit. A specification for modern GPUs can include complete CPU compliant software including GLSL (OpenGL Shading Language) support. Certain GPUs can support a general purpose programming language, and may be referred to as a general purpose programming GPU (GPGPU). FIG. 2 illustrates an exemplary capability of various processing units such as CPU, GPU and DSP. Some processing tasks, including computational processes, are CPU-specific, GPU-specific, and DSP-specific, and can only be performed on the CPU, GPU and DSP, respectively. Other common processes can be performed on a combination of processing units, such as either on CPU and GPU, on GPU and DSP, on CPU and DSP, or on any of the processors. The distinction is largely dynamic since it depends heavily on the specific hardware of the processing units.

In one embodiment of the present invention, it is recognized that the general purpose nature of modern special purpose processing units can be exploited to optimize system performance and/or power consumption. In the development of a software library for image processing, it was determined that not all programmable GPUs have performance characteristics that are balanced with the CPU in the same system. Thus originally, all image processing execution is defaulted to the best processor. For example, the CPU is the default for mismatched systems, and GPU is the default for system with GLSL capable hardware.

However, not all processing tasks are optimized on the same processor. For example, in certain systems, some image processing operations are better performed on the CPU than on the GPU. On some portable systems, it was observed that under heavy load, the GPU could consume as much power as the CPU. In some other systems, it was observed that sleeping the GPU core produced significant power savings.

Thus the present redistribution of processing tasks for system optimization is generally based on power consumption or system performance including fast execution time or load balancing. For example, moving some image processing operations to a fast GPU enables an execution rate which is many times faster than on the CPU. In some cases, moving selected operations to the GPU yields similar speed, but provides better load balancing, thereby freeing some of the CPU load for other tasks not appropriate for the GPU. In one aspect, shifting load at run time can be based on the optimization of power consumption, thereby extending battery life. This power optimization approach is different from a power throttling technique where the power savings comes from the fact that the throughput is artificially limited, and not by re-arranging the load between the different devices. For example, in a system where the GPU consumes significant power, the system can be forced to idle the GPU more by shifting loads to the CPU. Overall performance might be affected, but battery life could increase. In other aspect, the image processing tasks such as rendering contexts are evaluated and then granted GPU or CPU execution based on their characteristics and the desired power target or performance target for the system at that moment.

Figure 3:
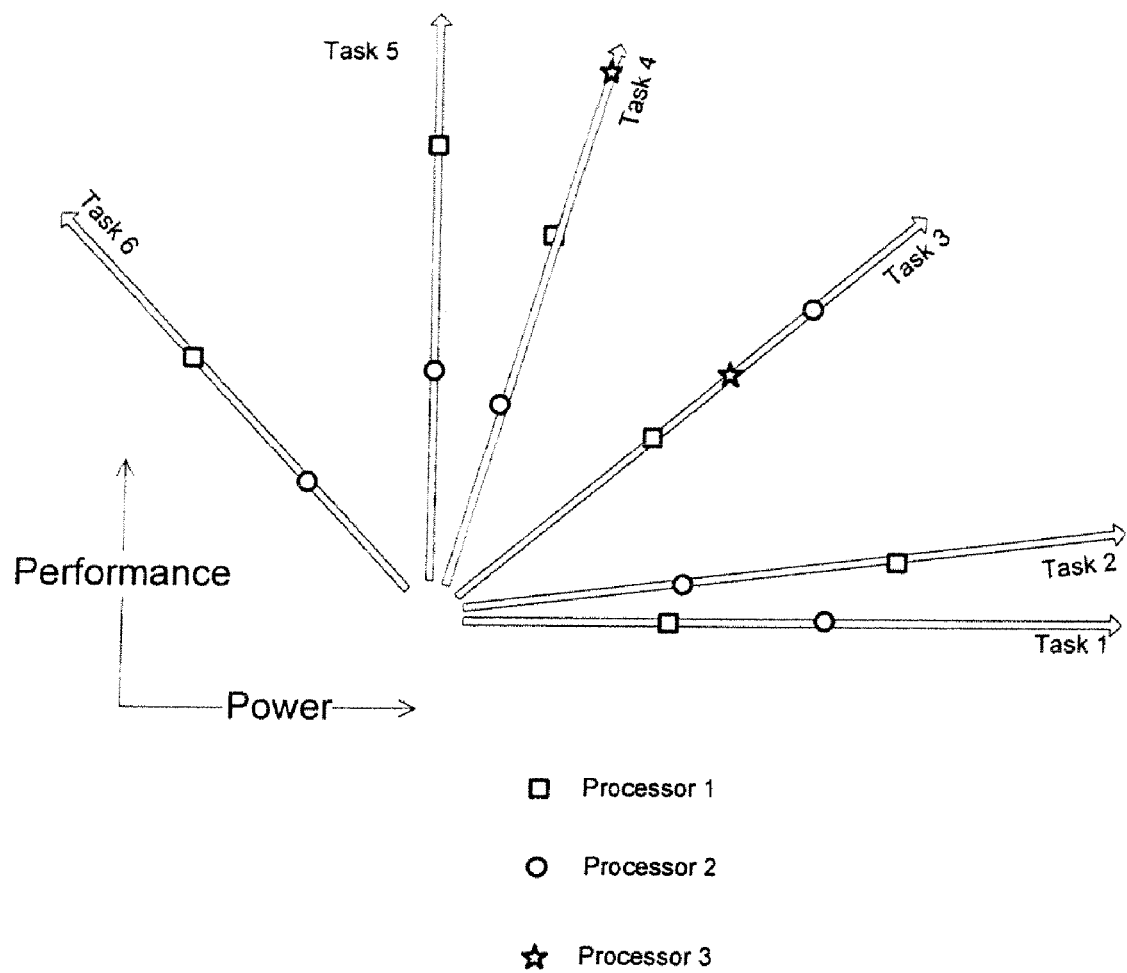
FIG. 3 illustrates a power-performance space for various processing tasks for multiple processors.

In one embodiment of the present invention, it is further recognized that various processing tasks can produce different power consumption and performance on different processors or subsystems. FIG. 3 illustrates an exemplary power-performance space for various processing tasks (Tasks 1-6 are shown) and processors (Processors 1-3 are shown). For simplicity, linear behaviors are shown for processing tasks, but in general more complex behaviors are possible.

As shown, Task 1 can be run on Processor 1 (square) or Processor 2 (circle) with similar performance on both processors but with higher power consumption if run on Processor 2. Thus optimization on power would earmark Task 1 to be run on Processor 1 first, in the absence of other overriding criterion such as load balancing.

For the path of Task 2, the slope is small, meaning the ratio of performance over power is small, or high power consumption for low performance gain. Power optimization would select Processor 2 for Task 2, and performance optimization would select Processor 1. For cost effectiveness, or value performance, Processor 2 can be chosen since Process 1 is more expensive, meaning the system consumes a lot more power for only a little performance improvement.

For Task 3, the process can be run on Processor 1 (square), 2 (circle) or 3 (star). The slope of Task 3 is about even, which can mean that good performance is delivered for good power consumption. Processor 1 is best for power optimization, while Processor 2 is best for performance optimization. For value optimization, any Processor would be acceptable, and thus a secondary criterion, e.g. power or performance, might be employed.

For the path of Task 4, the slope is high, meaning the ratio of performance over power is high, or there is low additional power consumption for higher performance gain. Power optimization would in one embodiment select Processor 2, and performance optimization would in one embodiment select Processor 3. For value optimization, Process 3 can be the best choice.

For Task 5, higher performance is seen with minimum change in power consumption. Thus any optimization would select Processor 1.

Task 6 represents an exemplary dedicated hardware/software combination where high performance and low power are achieved on Processor 1 while processor 2 provides less performance and more power consumption.

From the characterization of processing tasks on multiple processing units, exemplary embodiments of the present invention provide a redistribution of processing tasks on multiple processors for system optimization. In one embodiment, system profile, including power consumption, performance, and cost effectiveness for each subsystem or processor and for each processing tasks such as computational processes, is determined and saved (e.g. this information is collected and saved in a table). Determining this profile can comprise producing matrices of power consumption, performance, and value, e.g. cost effectiveness, for the subsystems and the one or more computational processes. FIG. 4 illustrates an exemplary processor matrix for three exemplary processors (CPU, GPU and DSP) and for four processing tasks (Task 1, Task 2, Task 3, and Task 4). The exemplary matrix comprises values for power consumption, performance, and value for each processing task executed on each of the three processors. A value criterion can represent a cost effectiveness of a particular processing task on a particular processor, such as performance-power ratio or a time per watt value. The values for the matrix can be relative, representing a comparison between the various processors. In one aspect, this matrix presents similar information as that of FIG. 3.

Of particular interest is an exemplary abnormally high number 80 for a power consumption value for processor DSP for processing Task 4. In one aspect, an optimization avoids running tasks on processors that exhibit abnormally high power values relative to other processors. The exemplary abnormally low number 0.1 for a performance for processor GPU for Task 2 can be avoided by an optimization which avoids running tasks on processors that exhibit abnormally low performance value.

This processor profile can, once created and saved, then be used in dynamically redistributing the processing tasks, e.g. computational processes, among the subsystems, e.g. processors, according to a predetermined setting or other information used in determining how to redistribute processing tasks. FIG. 5 illustrates exemplary settings of power, performance, value and dynamic. These settings may be selected by a user (e.g. through a user interface or by the system based on information such as temperature, power supply status (e.g., battery level), etc. In the low power setting, the processing tasks can be redistributed to reduce the power consumption of the system, and preferably to achieve the lowest power consumption. In the high performance setting, the processing tasks can be redistributed to achieve a high performance, and preferably best performance, even with higher power consumption. In the value setting, the processing tasks can be redistributed to achieve a cost effectiveness, or value performance (which may be based on a performance/power ratio). Examples of cost effective or value performance settings include a power/performance ratio such as second per watt (processing time to complete a task divided by the power used during that processing time), where a low number indicates a cost effective solution. In the dynamic setting, the processing tasks can be redistributed dynamically and automatically based on certain criteria, such as preventing abnormally high power, preventing abnormally low performance, overloading or exceeding power or thermal limits, the state of a power supply (e.g. battery level), or information about prior processing loads, etc.

For example, to avoid damage to the computer system, a dynamic power management system is used to dynamically budget the power usage of at least some of the components of the computer system such that, when the heavy tasks are imposed on the system, the system can trade performance for power consumption to stay within the power usage limit.

Exemplary processing tasks to be redistributed include software pipelines which can be re-assigned to different hardware such as graphics tasks; image processing, digital image processing or video image processing, such as image decoding, Bayer filtering, video decoding, image editing, image manipulation, image compression, feature extraction; rendering such as rendering of bitmap graphics, text, and vectors both on-screen and in preparation for printing, 2D or 3D rendering, rendering of pdf documents; compositing, filtering, transforming, deconvolution.

In one embodiment, the processor profile, e.g. processor matrix, of power consumption, performance, cost effective is provided as a function of the loading of the subsystems. Power or performance of a processor can be degraded when the CPU is fully busy as compared to when the CPU is idled. System load is usually not balanced, where one often encounters a situation where some parts of the computer system are operating at full power, and other parts of the system are operating at low power. For example, when one is performing a scientific computation, the CPU is very busy and is consuming close to full power, but the GPU or DSP is consuming only modest power. When one is watching a TV station, the DSP can consume close to full power because it is processing in real time the analog signal of the TV to digital signal, and the GPU can also consume close to full power because it is rendering the video images, but the CPU can consume only modest power.

A load profile of the system is defined by workloads of each of the subsystems in the system. A workload of a subsystem may be determined using various techniques. In one embodiment, a workload of a subsystem determines the amount of power used by the subsystem in the system. In another embodiment, the operating system may determine the workload of the subsystem from historical scheduling data, or an application may explicitly inform the system about the workload. Various applications provide various workloads to each of the subsystems. For example, program development tools and scientific applications present a high load to the CPU, but almost no load to the GPU that leads to an asymmetric load profile of the system (e.g. the CPU consumes a lot more power than the GPU). Many professional applications present an alternating high workload to the CPU and to the GPU that result in an alternating asymmetric load profile of the system. Advanced user interfaces or graphics editing application present a high load to the GPU and a modest load to the CPU that leads to another asymmetric load profile to the system. In one embodiment, the load profile may be identified using workloads determined by measuring/sensing power (e.g. current drawn) by each subsystem or by measuring power for certain subsystems and estimating or predicting power for other subsystems or by estimating power for all subsystems. In another embodiment, the load profile may be identified using workloads determined by the operating system from historical scheduling data. In yet another embodiment, to identify the load profile of the system, the information about the workload of the subsystem provided by an application may be used.

FIG. 6 illustrates an exemplary processor matrix showing relative power consumption, performance and value performance of various processors (e.g. CPU, GPU and DSP) for Task 1 under different loads (idle, 30%, 60%, and 90%). FIG. 6 illustrates a general concept of processor, which typically exhibits higher power consumption and lower performance with higher loading. Data for this matrix can be determined through actual measurements, and the matrix can be stored with actual values. The matrix can be stored in a non-volatile memory (e.g. a hard disk or flash memory) for future use when the system is running. Alternatively, weighting factors or trend factor can be stored to represent the power consumption, performance and value performance of multiple processors for multiple processing tasks under different loads.

Thus by redistributing the processing tasks to various processors according to a setting or other information used in determining how to redistribute processes, the system's character can be dynamically changed with a substantially high accuracy, so as to be a balanced system, a CPU-heavy machine, a GPU-heavy system, or any other subsystem-heavy system through software control. In some embodiments, the setting may be predetermined. As a result, efficient, dynamic power/performance management for the system is provided, where the processors may have their performance, and, as a side effect, their power, adjusted fairly transparently to the software, based on the present workloads of the subsystems. For example, the power of the system may be provided to a busier GPU, while causing the CPU to slow down without affecting performance of the CPU. That is, a GPU can work at a higher speed in exchange for slowing down the operations on the CPU without visibly affecting the user's perception of the performance of the CPU while the GPU's performance is visibly improved. In another embodiment, the performance of a system, e.g., a portable computer, may alternate between GPU-heavy and CPU-heavy continuously (this kind of workload happens frequently in the frame-by-frame processing of digital video). This dynamic shifting of allocated power to various subsystems, based on monitoring a current load profile, is particularly useful for small, thin laptop computers which have small batteries and may not have cooling systems with large cooling capabilities, and this dynamic shifting is also particularly useful for small desktop computers (e.g. Mac Mini) or a laptop which may not have cooling systems with large cooling capabilities.

In one embodiment of the present invention, the processing tasks are compiled to generate machine executable codes for multiple processors. Different processors might be optimized with different sets of instructions, thus a process would be best optimized if compiled for that particular processor. For example, a graphics rendering process is normally compiled to run on a GPU, which can handle parallel graphics processing and thus optimally compiled with parallel processing. For this graphics rendering process to run on a CPU, which may not handle such parallel graphics processing, the compilation is more linear to ensure optimal prosecution of the process. The various compilations for various processors can be separate execution codes, or can be compiled in one large execution code with various branching instructions for various processor types. In another embodiment, the processing tasks can be complied for one processor and run on other processors through emulation software.

In an exemplary embodiment, the redistribution of processing tasks between the plurality of processors comprises determining and storing processor-specific compiled codes. The redistribution further comprises the loading and running of processor-specific compiled code on the specific processor. The processor profile then can include the processor-specific executable code, the link to the processor-specific executable code, or a flag indicating the branches to the processor-specific executable code.

Figure 7:
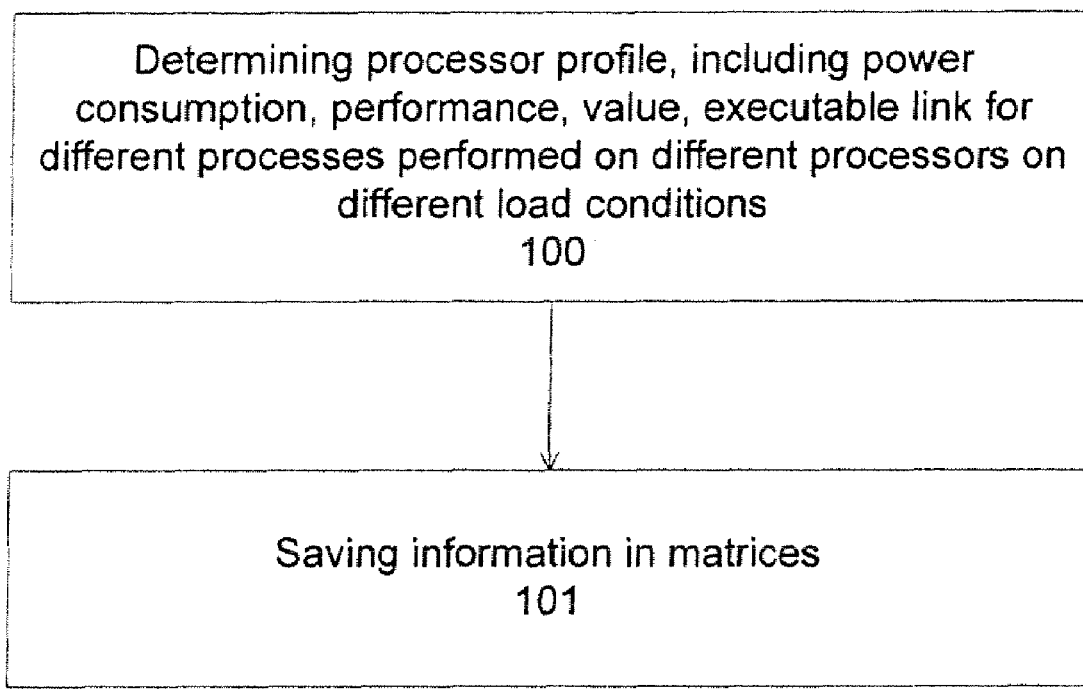
FIG. 7 illustrates an exemplary method of generating a processor profile matrix.

FIG. 7 is a flowchart of one embodiment of a method to dynamically redistribute processing tasks between a plurality of processors. The method begins with operation 100 which determines a processor profile for the data processing system. The system profile can include information about one or more power consumption, performance, or value (or cost effectiveness) of multiple processing tasks performed on multiple processing units in the system. In one embodiment, executable codes for the multiple processing tasks are specifically compiled to generate processor-specific instructions to optimize that processing task on that specific processor. The processor profile can include information about the processor-specific executable codes, such as the code itself, the API's used or the types of processing operations, the link to the code, or a branching instruction to allow the usage of the processor-specific instructions. Next, in operation 101, the processor profile information is saved, preferably in matrices. This processor profile can be used in assisting the decision of redistributing processing tasks according to a desired setting or other information used in deciding how to redistribute processing tasks.

The data processing systems typically have different processor components, including upgraded processor, exchanged processor or replaced processor. For optimizing different configurations, an exemplary embodiment of the present invention provides a software driver for each processor, comprising processor profile information about that processor with regard to power consumption, performance or value for multiple processing tasks under various loading conditions. The processor profile can further comprise information with regard to optimizing executable codes running under that processor.

In one embodiment, another subsystem, e.g. processing unit, can be added to the plurality of the subsystems, e.g. processing units. This addition may occur after the system is manufactured and it may be performed by the owner/user of the system; adding or changing a graphics card is an example of this addition. Then, another processor profile of the system that includes the another subsystem is identified. The processor profile may be identified using the software driver of each of the subsystems, including the another subsystem. The processor profile may be identified by combining the software driver for the newly added processor with the existing processor profile. The processing tasks then can be redistributed among the subsystems including the newly added subsystem using the updated processor profile.

Figure 8:
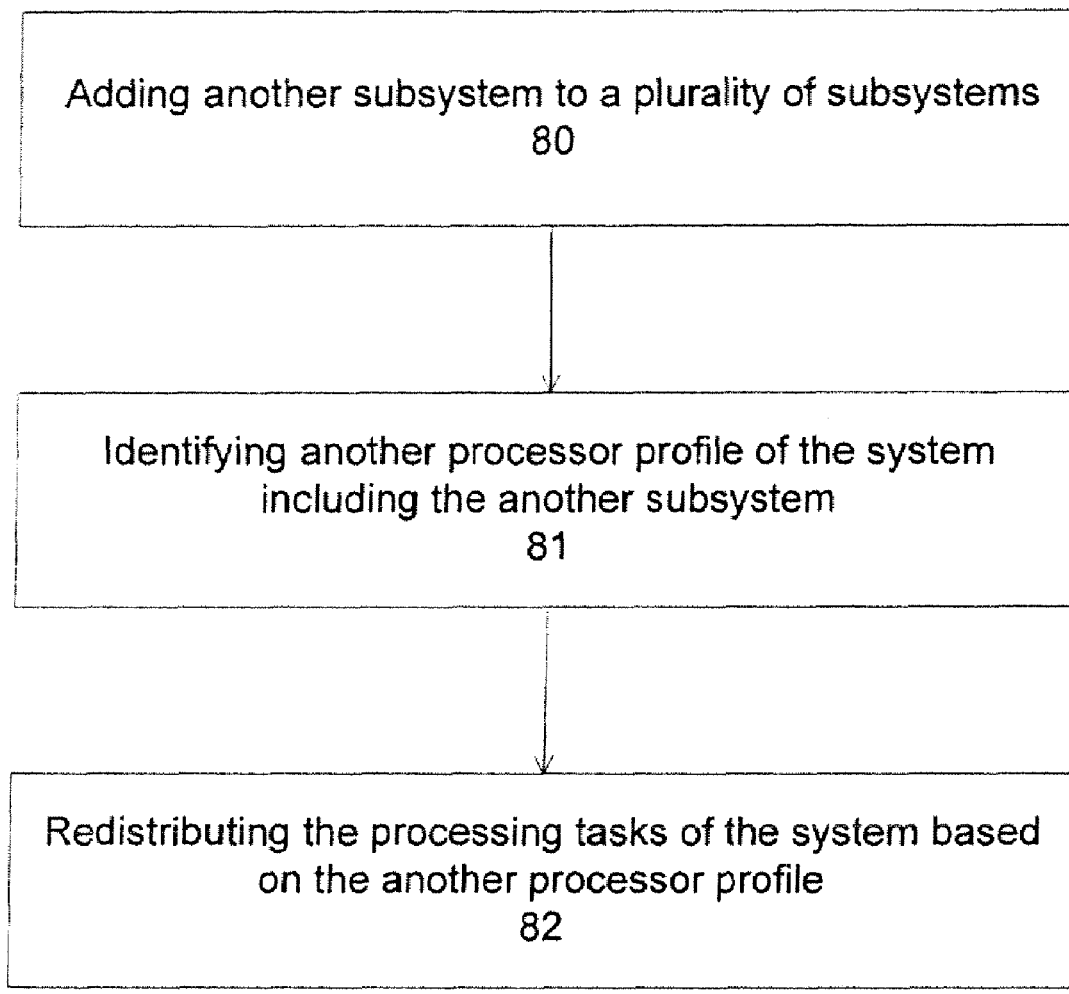
FIG. 8 shows an exemplary method to generating a processor profile when adding another processor to the system.

FIG. 8 is a flowchart of one embodiment of a method to dynamically redistribute processing tasks between a plurality of processors when another subsystem is added to the system. The method begins with operation 80 of adding another subsystem to a plurality of subsystems. In one embodiment, another subsystem, e.g., a second CPU, or a peripheral device, is added to the system which already includes at least a first CPU and a GPU. Adding another CPU or a peripheral device to the processing system is known to one of ordinary skill in the computer art. Next, in operation 81 identifying another processor profile of the system that includes an added subsystem is performed, as described above. In one embodiment, the another processor profile is identified by employing a processor profile provided by a software component (e.g. a software driver) of the added subsystem. The processor profile can then be calculated using the added processor profile for each of the subsystems including the added subsystem. The processor profile can then be calculated by consolidating the existing processor profile with the added processor profile for the added subsystem. Next, in operation 82, the processing task or tasks of the system are redistributed between the subsystems based on the new system profile. In one embodiment, adding another subsystem may require a compilation of the processing tasks to generate that processor-specific executable codes. In such a case, the processor-specific executable codes for various processing tasks are pre-compiled during the generation of the processor profile, with the link to the processor-specific codes included in the processor profile.

Figure 9:
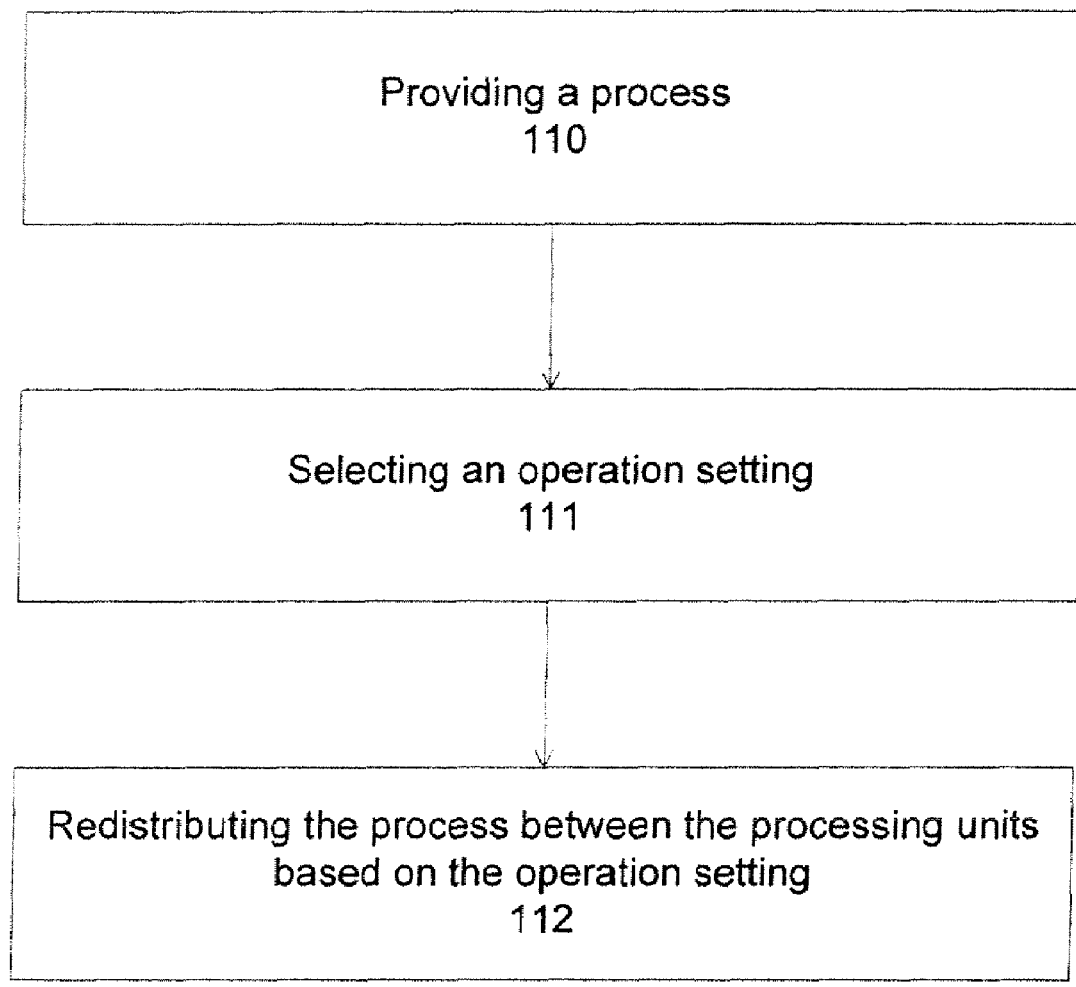
FIG. 9 illustrates an exemplary method for redistributing processing tasks between multiple processors.

One exemplary embodiment of process redistribution, shown in FIG. 9, can be performed as followed. At least one processing task is provided, in operation 110. In operation 111, an operation setting is selected. These two operations can be in any order, such as the operation setting can be selected before a processing task is provided. The operation setting may be selected by a user (e.g., through a user interface) or by the system automatically based on information such as temperature measurement, power supply status (e.g. battery level), processing loads for the different subsystems, etc. The processing task can be assessed for the capability of running in different processing units. For example, a graphics rendering process can run on a GPU or CPU or DSP. If capable, the process is redistributed between the different processing units based on the operation setting, operation 112. In one embodiment, the assessment is included in the redistribution operation.

In one embodiment, the redistribution process manages the processing tasks of a computer system that leverages the sharing capability of multiple processing units. The computer system includes one or more components ("subsystems").

The subsystem may be a microprocessor, a microcontroller, a CPU, a GPU, or any combination thereof. A subsystem may itself include multiple processors, such as a CPU which has a plurality of processing cores. The redistribution process switches the processing tasks typically between general purpose and special purpose processing units. For example, the redistribution switches a graphics task between a GPU and a CPU or a DSP based on a predetermined setting. The graphics tasks can include 2D and 3D rendering engine, rendering of pdf documents, image processing, image and video decoding.

Figure 10:
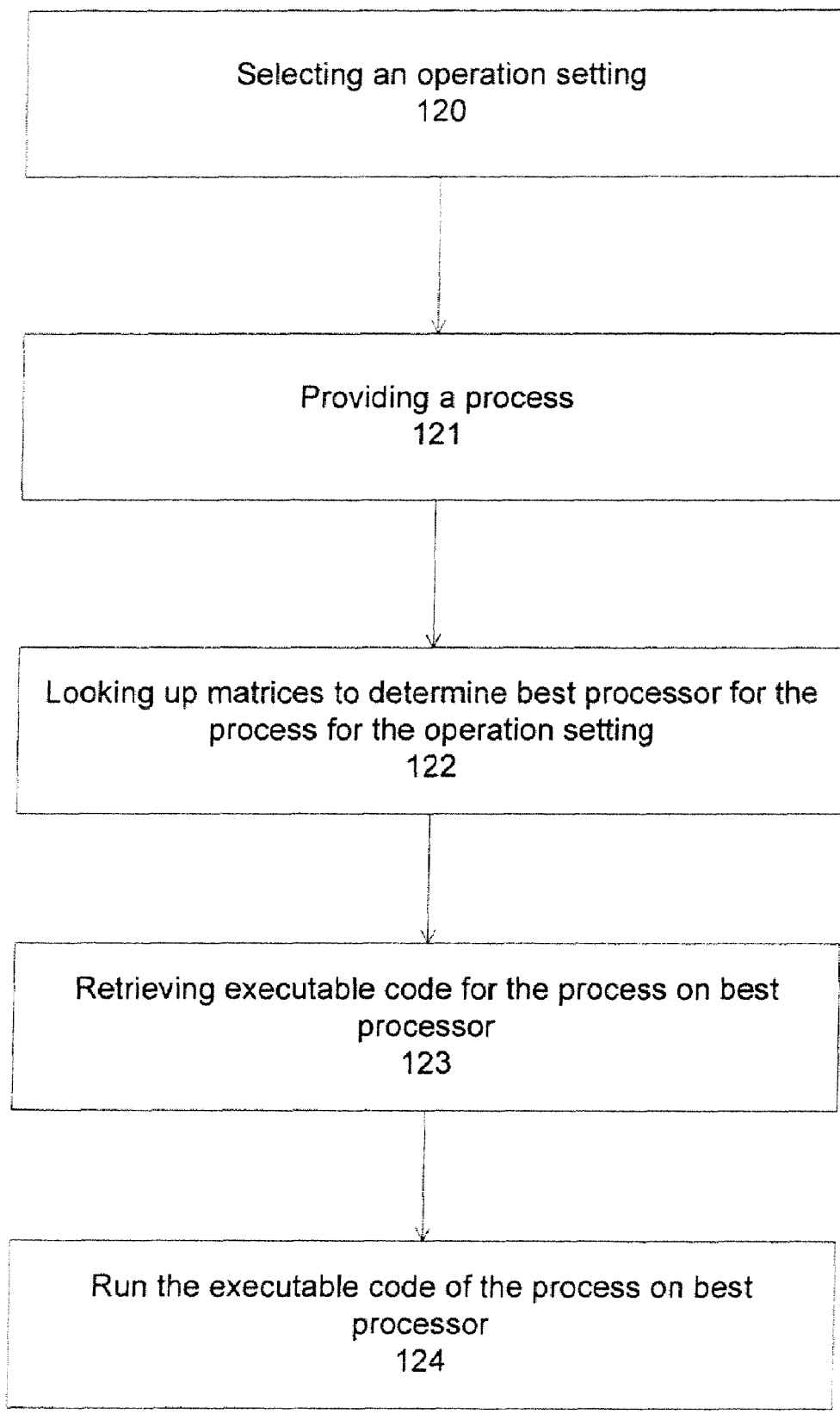
FIG. 10 illustrates another exemplary method for redistributing processing tasks between multiple processors.

FIG. 10 illustrates a method to dynamically redistribute one or more processing tasks according to one embodiment of the present invention. In FIG. 10, an operation setting is selected (120). This operation setting, as explained above, may be set by the user or by the system. When a processing task will need to performed (121), the process redistribution will look up processor profile matrices to determine the best processor(s) for a particular task according to the operation setting (122). The processor profile matrices comprise information relating to the operation setting to enable the selection of the best processor(s) to meet the demand or desire of the operation setting. For example, the processor profile matrices comprise power consumption information for the particular processing task to be performed on multiple available processors, and therefore to satisfy an operation setting of low power consumption, looking up the desired information in the processor profile matrices can provide the best suitable processor. Furthermore, a processing task can be split up into various sections, for example, in parallel processing mode, and each section can be performed on same or different best processor. The information in the matrices also takes into account the loading factor of the available processors, and thus the best available processor(s) includes the consideration of how busy each processor is at that particular moment. Note that a "best" processor for the selected processing task can be selected according to certain rules that define goal "best". It is understood that the rules for define the goal can be arbitrarily complex and that the rules can depend upon the type of task (as show in FIG. 4).

The executable codes for the processing task and specific to the best processor are then retrieved (123) before running on the selected processor(s) (124). Information regarding the executable codes can be contained in the processor profile matrices, and can be retrieved together with the selection of the best processor. In other embodiments, the code can be run in an emulation mode as described herein.

Figure 14:
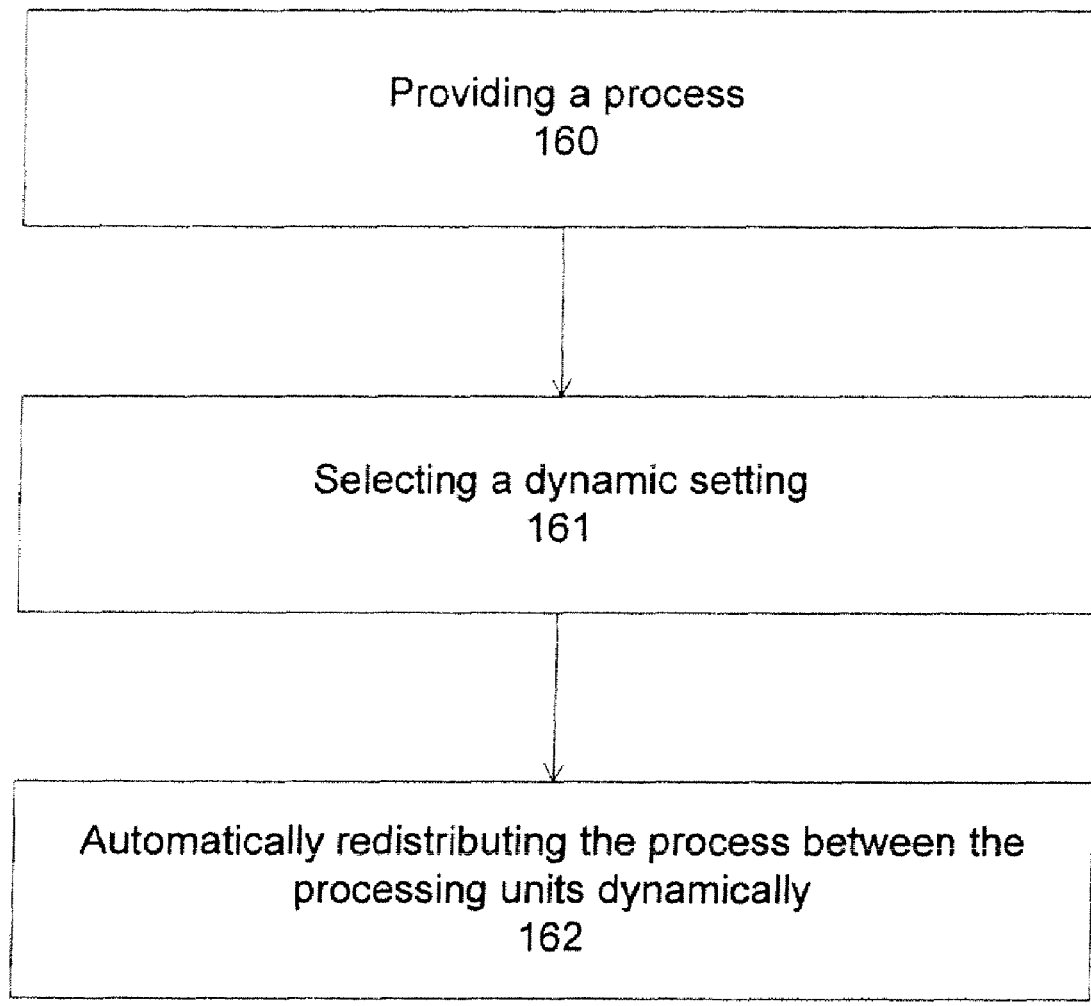
FIG. 14 illustrates an exemplary method for redistributing processing tasks between multiple processors according to a dynamic setting.

In one embodiment of the present invention, the operation setting comprises one of a power consumption setting, a performance setting, a value setting, and a dynamic setting. In the power consumption setting, the processing tasks are redistributed to achieve low power consumption. In the performance setting, the processing tasks are redistributed to achieve high performance, even at the expense of higher power consumption. In the value setting, the processing tasks are redistributed to achieve a cost effective or value performance (which may be based on a performance/power ratio). In the dynamic setting, the processing tasks are automatically and dynamically redistributed to achieve at least one of long lasting battery performance, prevent abnormally poor performance, prevent abnormally high power consumption, or prevent exceeding power or thermal limits, and these processing tasks can be automatically and dynamically redistributed based on measurements of one or more of temperature(s) in or around the system, power levels being used, the state of power supplies (e.g. state of a battery's charge level), processing state of a subsystem (e.g. the processing load, measured as a percentage of maximum usage on the subsystem), etc. Operation 162 in FIG. 14 is an example of a system automatically redistributing on or more processing tasks across at least two processors, and operation 162 can use, at least in certain embodiments, one or more of the measurements.

Figure 11:
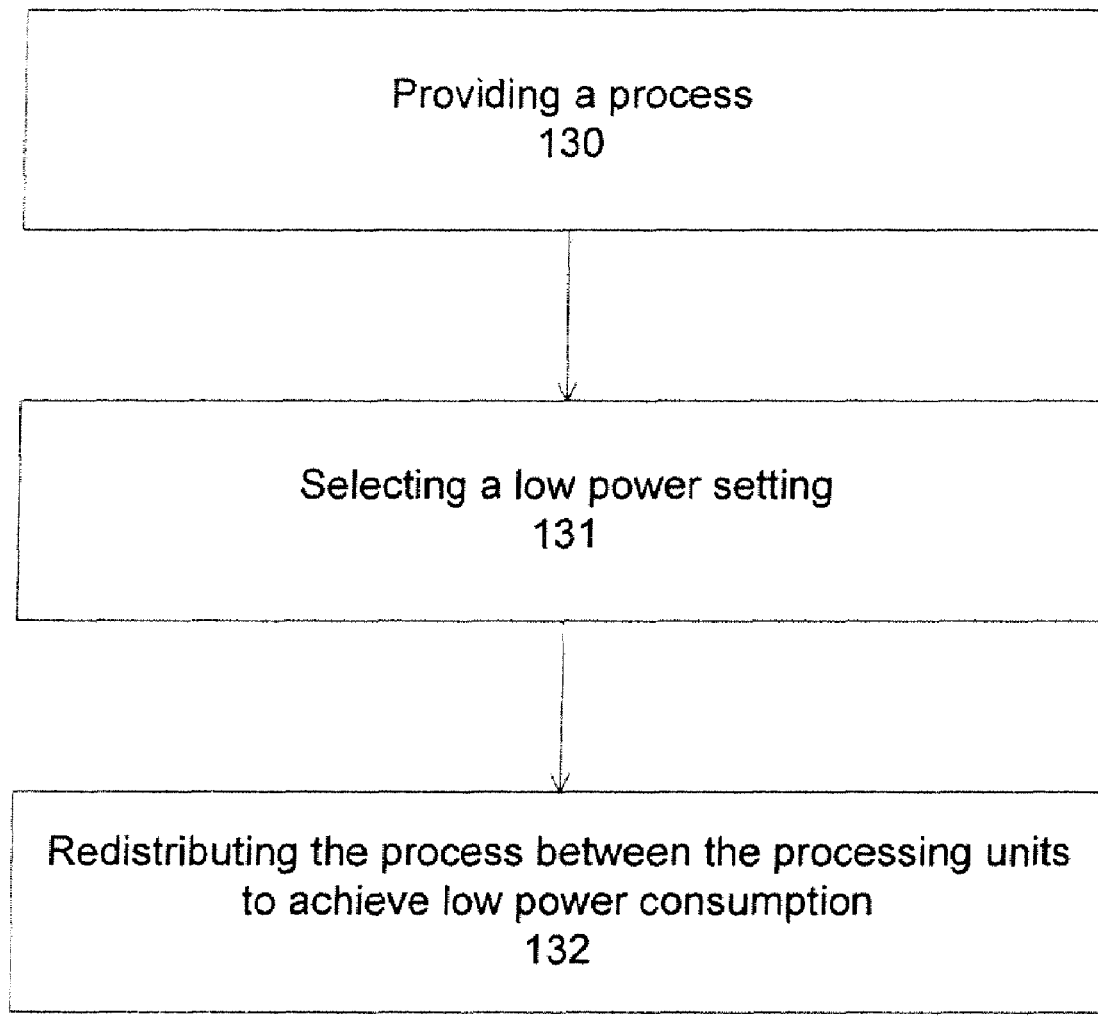
FIG. 11 illustrates an exemplary method for redistributing processing tasks between multiple processors according to a low power setting.

FIG. 11 illustrates a method to dynamically redistribute processing tasks between multiple processors to achieve a low power setting. A processing task is provided, in operation 130. In operation 131, a low power consumption setting is selected either by the user or by the system. These two operations can be in any order, for example, the setting can be selected before a processing task is provided. Then the processing task is redistributed between multiple processors to achieve low power consumption (132). Power consumption information can be determined from a processor profile, listing the power consumption for each possible processor for that processing task. The system can retrieve information about how busy the processors are, and can use it as an additional input to the processor profile to further fine tune the power consumption determination process. Typically, the system selects the processor providing the least power consumption for the processing task with the information given. The system can also operate with other complex rules and procedures, for example, rules for predicting the loading of the processors, or rules for load balancing to conserve power due to anticipating coming processing tasks. For example, power consumption data can be the instantaneous power consumption, the maximum power consumption, the average power consumption or the total power consumption for the processing task. Thus the power consumption might take into account the processing time. After the selection of best processor, suitable executable codes are performed.

Figure 12:
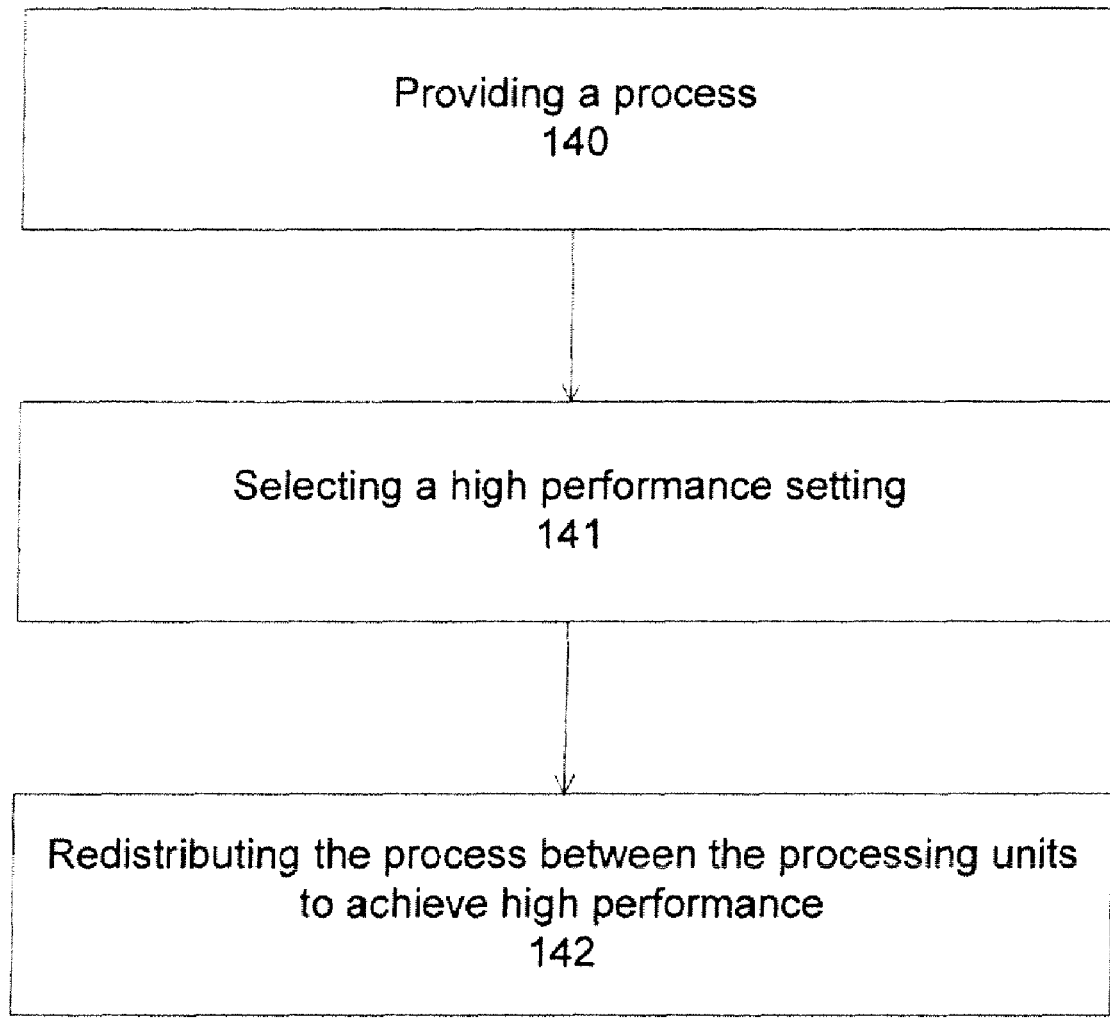
FIG. 12 illustrates an exemplary method for redistributing processing tasks between multiple processors according to a high performance setting.

FIG. 12 illustrates a method to dynamically redistribute processing tasks between multiple processors to achieve a high performance setting. A processing task is provided, in operation 140. In operation 141, a high performance setting is selected either by the user or by the system. These two operations can be in any order, for example, the setting can be selected before a processing task is provided. Then the processing task is redistributed between multiple processors to achieve high performance (142). Performance information can be determined from a processor profile, listing the performance, e.g. time for complete the task, for each possible processor for that processing task. The system can retrieve information about how busy the processors are, and can use it as an additional input to the processor profile to further fine tune the performance determination process. Actual power usages can be monitored to determine the loading of the processors. For example, the actual power usage can be measured periodically to determine the history of the power usage. Typically, the system selects the processor providing the best performance for the processing task with the information given. The system can also operate with other complex rules and procedures, for example, rules for predicting the loading of the processors, or rules for load balancing to improve performance due to anticipating coming processing tasks. Load balancing can be performed based on actual power consumption, for example with core temperature of the CPU using hardware diagnostic registers, or the battery voltage changing over time. After the selection of best processor, suitable executable codes are performed.

Figure 13:
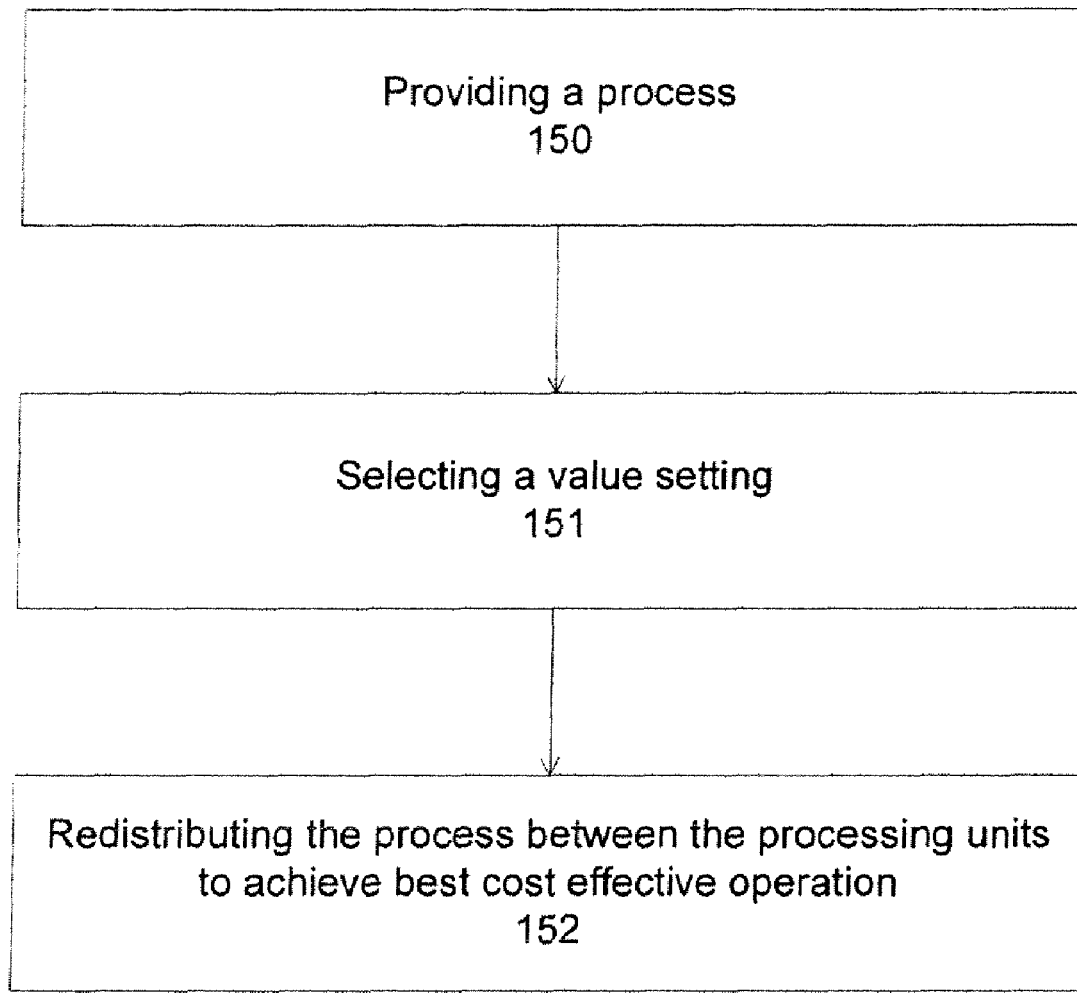
FIG. 13 illustrates an exemplary method for redistributing processing tasks between multiple processors according to a value setting.

FIG. 13 illustrates a method to dynamically redistribute processing tasks between multiple processors to achieve a value setting. A processing task is provided, in operation 150. In operation 151, a value setting is selected either by the user or by the system. These two operations can be in any order, for example, the setting can be selected before a processing task is provided. Then the processing task is redistributed between multiple processors to achieve the desired value (152). Value setting can include cost effectiveness (e.g. based on a performance/power ratio) for the processing tasks. For example, it is not cost effective, e.g. not delivering a good value, when a processing task can save a few percents of power consumption but take twice as long to complete. A measure of value is inversely proportional to the amount of time it takes for a processing task to complete and is inversely proportional to the amount of power it takes for a processor to perform the task. A minimum background level of power consumption (which a system will normally consume as a background level when running) may be considered in determining a measure of value. In some cases, value performance might be similar to total power consumption where the product of power consumption and the processing time determines how much power is consumed for the processing task. Value setting can include the ratio of power/time (or time/power), indicating how many watts of power is consumed per second of processing time (or how much processing time is provided for per watt). Value information can be determined from a processor profile, listing the performance and the power consumption for each possible processor for that processing task. The system can retrieve information about how busy the processors are, and can use it as an additional input to the processor profile to further fine tune the performance/power determination process. Typically, the system selects the processor providing the best performance for the processing task with the information given. The system can also operate with other complex rules and procedures, for example, rules for predicting the loading of the processors, or rules for load balancing due to anticipating coming processing tasks. After the selection of best processor, suitable executable codes are performed.

FIG. 14 illustrates a method to dynamically redistribute processing tasks between multiple processors to achieve a dynamic setting. At least one processing task is provided, in operation 160. In operation 161, a dynamic setting is selected either by the user or by the system. These two operations can be in any order, for example, the setting can be selected before a processing task is provided. Then the processing task is automatically and dynamically redistributed between multiple processors (162). During the dynamic setting, the system automatically redistributes the processing tasks according to various default settings or rules which can use, as inputs for the rules, information. For example, if a process has an abnormally high power consumption, or an abnormally low performance, this process could be prevented from running on that processor. The process can automatically switch to, or continue to maintain, a performance setting when system is on AC power, and preferably when the battery is fully or almost fully charged. When the battery is still charging, the process can stay at power consumption setting. Under battery power, the process can automatically switch to a power conservation setting when the battery is down to a time setting, for example, 10 minutes warning or battery charge level or remaining battery capacity. The processing tasks are then dynamically and automatically redistributed.

The process can also automatically redistributed to ensure that the actual power usage is within the power usage constraints, or to ensure that the system will not require power usage more than a determined budget or that a thermal budget (e.g. temperature limits within a system) are not exceeded. After the selection of best processor, suitable executable codes are performed.

Thus, in exemplary embodiments, the present invention can rely on software modules without or with minimum hardware components to achieve the best or other value for the data processing system with multiple processors. In one embodiment, the redistributing process is partially or entirely implemented as a software module running on the main microprocessors. The processor profile and drivers for processors can also be implemented using a software module using a random access memory of the computer system or using a dedicated hardware module.

Many of the methods of the present invention may be performed with a data processing system, such as a conventional, general-purpose computer system. Special purpose computers, which are designed or programmed to perform only one function, may also be used.

Figure 15:
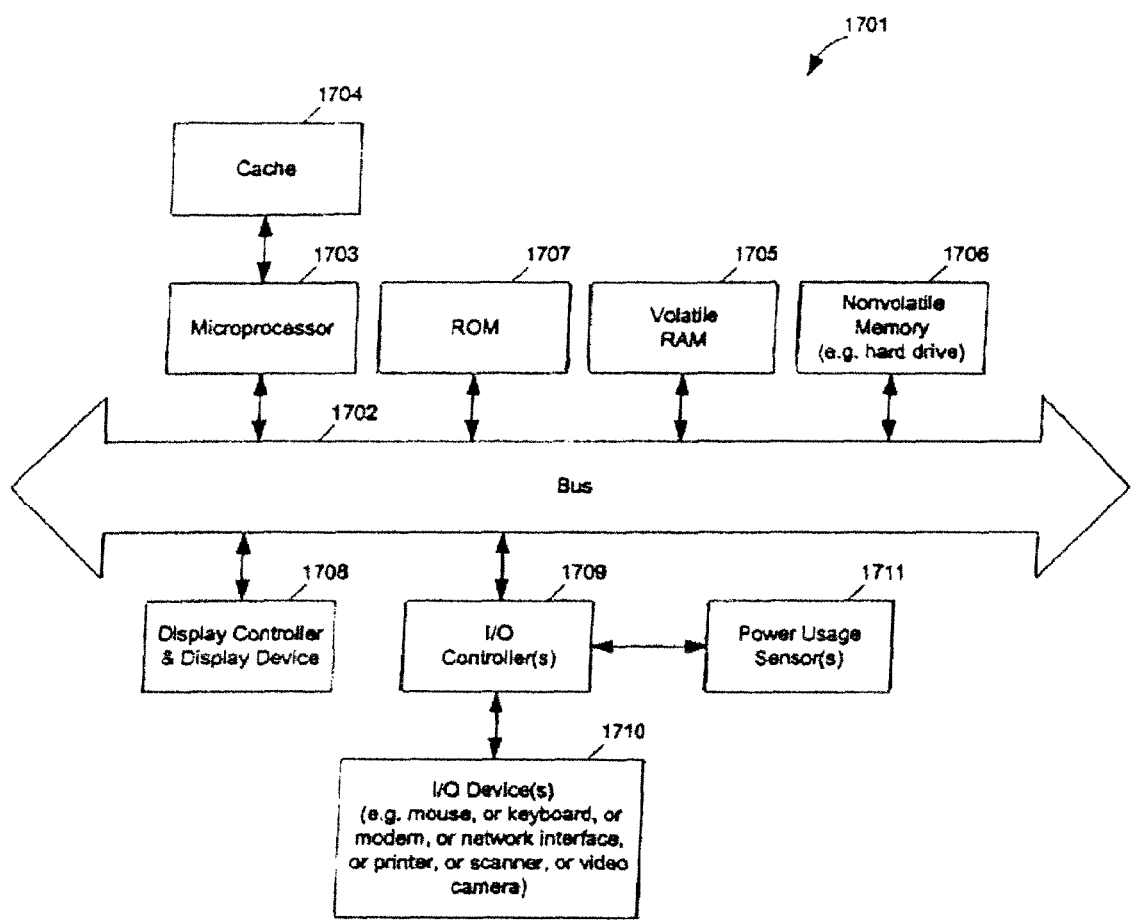
FIG. 15 shows a block diagram example of a data processing system which may be used with the present invention.

FIG. 15 shows one example of a typical computer system which may be used with the present invention. Note that while FIG. 15 illustrates various components of a computer system, it is not intended to represent any particular architecture or manner of interconnecting the components as such details are not germane to the present invention. It will also be appreciated that network computers and other data processing systems which have fewer components or perhaps more components, such as cellular telephones, PDAs, entertainment systems, media players, embedded systems, and consumer electronic devices, may also be used with the present invention. The computer system of FIG. 15 may, for example, be an Apple Macintosh computer.

As shown in FIG. 15, the computer system 1701, which is a form of a data processing system, includes a bus 1702 which is coupled to a microprocessor 1703 and a ROM 1707 and volatile RAM 1705 and a non-volatile memory 1706. The microprocessor 1703, which may be, for example, a G3, G4, or G5 microprocessor from Motorola, Inc. or IBM or a Pentium microprocessor from Intel is coupled to cache memory 1704 as shown in the example of FIG. 17. The bus 1702 interconnects these various components together and also interconnects these components 1703, 1707, 1705, and 1706 to a display controller and display device 1708 and to peripheral devices such as input/output (I/O) devices which may be mice, keyboards, modems, network interfaces, printers, scanners, video cameras and other devices which are well known in the art. Typically, the input/output devices 1710 are coupled to the system through input/output controllers 1709. The volatile RAM 1705 is typically implemented as dynamic RAM (DRAM) which requires power continually in order to refresh or maintain the data in the memory. The non-volatile memory 1706 is typically a magnetic hard drive or a magnetic optical drive or an optical drive or a DVD RAM or other type of memory systems which maintain data even after power is removed from the system. The system profiles described herein, such as the profile shown in FIG. 4, may be stored in non-volatile memory 1706. Typically, the non-volatile memory will also be a random access memory although this is not required. While FIG. 15 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1702 may include one or more buses connected to each other through various bridges, controllers and/or adapters as is well known in the art. In one embodiment the I/O controller 1709 includes a USB (Universal Serial Bus) adapter for controlling USB peripherals, and/or an IEEE-1394 bus adapter for controlling IEEE-1394 peripherals.

In one embodiment of the present invention, the system 1701 further includes power usages sensor(s) 1711 that are coupled to the I/O controller(s) 1709. One or more sensors may be used to determine the power usage of the Central Processing Unit (CPU) (e.g., microprocessor 1703) and/or the Graphical Processing Unit (GPU) (e.g., a processor of the display controller 1708). Further, one or more sensor may be directly coupled to the CPU and/or GPU. The power usage sensor(s) 1711 may include one or more current sensors measuring the actual current drawn by the components, and/or the actual current drawn by the system. In one embodiment, the power usage sensor(s) 1711 may include a crude power usage sensor to determine the global state of the component, which can be used to dynamically estimate the power usage requirement of the component.

In one embodiment of the present invention, the microprocessor 1703 dynamically budgets power usage and determines throttle settings according to instruction stored in cache 1704, ROM 1707, RAM 1705, and/or nonvolatile memory 1706. Alternatively, the system 1701 can include a microcontroller (not shown in FIG. 15) to dynamically redistributing the processing tasks between the processing units. In one embodiment, the data processing system may include multiple central processing unit (CPU)/microprocessors.

It will be apparent from this description that aspects of the present invention may be embodied, at least in part, in software. That is, the techniques may be carried out in a computer system or other data processing system in response to its processor, such as a microprocessor or a microcontroller, executing sequences of instructions contained in a memory, such as ROM 1707, volatile RAM 1705, non-volatile memory 1706, cache 1704, or other storage devices, or a remote storage device. In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 1703, or a microcontroller.

A machine readable medium can be used to store software and data which when executed by a data processing system causes the system to perform various methods of the present invention. This executable software and data may be stored in various places including for example ROM 1707, volatile RAM 1705, non-volatile memory 1706 and/or cache 1704 as shown in FIG. 15. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 1701 of FIG. 15.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method comprising:
   selecting a performance or power consumption setting of a system, the system including a plurality of processing units;
   determining values associated with the setting for each processing unit to perform a task, wherein the values are based upon one of
   a power consumption value for each processing unit to perform the task corresponding to a low power setting,
   a performance value for each processing unit to perform the task corresponding to a high performance setting, and
   a performance and power consumption ratio for each processing unit to perform the task corresponding to a cost-effective setting; and
   redistributing the task between the plurality of processing units based upon the determined values associated with the setting for each processing unit to perform the task.

2. The method as in claim 1, wherein the redistributing is done dynamically while the system is running and wherein the processing units comprise a central processing unit (CPU) and a special processing unit, and
   wherein the task is created from one of a plurality of different software pipelines.

3. The method as in claim 2, wherein the special processing unit is a graphics processing unit (GPU) and wherein the GPU performs a plurality of graphics processing operations when the high performance setting is selected and the CPU performs the plurality of graphics processing operations when the low power setting is selected.

4. The method as in claim 2, wherein the special processing unit is a GPU and wherein the GPU performs a plurality of graphics processing operations when the low power setting is selected and the CPU performs the plurality of graphics processing operations when the high performance setting is selected.

5. The method as in claim 1, wherein the task is at least one of a graphics rendering process, an image processing process, a signal processing process, a Bayer filtering process, a video decoding process, or any combination thereof.

6. The method as in claim 1, wherein the setting is selected from a group that includes
   a dynamic mode wherein the processing units are automatically chosen to prevent power or thermal overload based on a threshold.

7. The method as in claim 1, wherein the determination of values associated with the setting for each processing unit to perform the task includes determining the power consumption value, performance value, or performance and power consumption ratio for each processing unit to perform the task under a plurality of loads.

8. A system, comprising:
   a memory; and a plurality of processing units coupled to the memory through at least one bus, wherein one of the processing units is configured to
  determine values associated with the setting for each processing unit to perform a task, wherein the values are based upon one of
    a power consumption value for each processing unit to perform the task corresponding to a low power setting,
    a performance value for each processing unit to perform the task corresponding to a high performance setting, and
    a performance and power consumption ratio for each processing unit to perform the task corresponding to a cost-effective setting; and
  redistribute the task between the plurality of processing units based upon the determined values associated with the setting for each processing unit to perform the task.

9. The system as in claim 8, wherein the processing task is redistributed dynamically while the system is running and wherein the processing units comprise a central processing unit (CPU) and a special processing unit, and
  wherein the task is created from one of a plurality of different software pipelines.

10. The system as in claim 9, wherein the special processing unit is a graphics processing unit (GPU) and wherein the GPU performs a plurality of graphics processing operations when the high performance setting is selected and the CPU performs the plurality of graphics processing operations when the low power setting is selected.

11. The system as in claim 9, wherein the special processing unit is a GPU and wherein the GPU performs a plurality of graphics processing operations when the low power setting is selected and the CPU performs the plurality of graphics processing operations when the high performance setting is selected.

12. The system as in claim 8, wherein the task is at least one of a graphics rendering process, a image processing process, a signal processing process, a Bayer filtering process, a video decoding process, or any combination thereof.

13. The system as in claim 8, wherein the setting is selected from a group that includes
  a dynamic mode wherein the processing units are automatically chosen to prevent power or thermal overload based on a threshold.

14. The system as in claim 8, wherein the determination of values associated with the setting for each processing unit to perform the task includes determining the power consumption value, performance value, or performance and power consumption ratio for each processing unit to perform the task under a plurality of loads.

15. An article of manufacturing comprising:
a non-transitory machine-accessible storage medium storing data that, when accessed by a machine, cause the machine to perform operations comprising:
  selecting a performance or power consumption setting of a system, the system including a plurality of processing units;
  determining values associated with the setting for each processing unit to perform a task, wherein the values are based upon one of
    a power consumption value for each processing unit to perform the task corresponding to a low power setting,
    a performance value for each processing unit to perform the task corresponding to a high performance setting, and
    a performance and power consumption ratio for each processing unit to perform the task corresponding to a cost-effective setting; and
  redistributing the task between the plurality of processing units based upon the determined values associated with the setting for each processing unit to perform the task.

16. A article as in claim 15, wherein the redistributing is done dynamically while the system is running and wherein the processing units comprise a central processing unit (CPU) and a special processing unit, and
  wherein the task is created from one of a plurality of different software pipelines.

17. The article as in claim 16, wherein the special processing unit is a graphics processing unit (GPU) and wherein the GPU performs a plurality of graphics processing operations when the high performance setting is selected and the CPU performs the plurality of graphics processing operations when the low power setting is selected.

18. The article as in claim 16, wherein the special processing unit is a GPU and wherein the GPU performs a plurality of graphics processing operations when the low power setting is selected and the CPU performs the plurality of graphics processing operations when the high performance setting is selected.

19. The article as in claim 15, wherein the task is at least one of a graphics rendering process, a image processing process, a signal processing process, a Bayer filtering process, a video decoding process, or any combination thereof.

20. The article as in claim 15, wherein the setting is selected from a group that includes
  a dynamic mode wherein the processing units are automatically chosen to prevent power or thermal overload based on a threshold.

21. The article as in claim 15, wherein the determination of values associated with the setting for each processing unit to perform the task includes determining the power consumption value, performance value, or performance and power consumption ratio for each processing unit to perform the task under a plurality of loads.

* * * * *